US008107573B2

(12) United States Patent
Chang

(10) Patent No.: US 8,107,573 B2
(45) Date of Patent: Jan. 31, 2012

(54) METHOD AND APPARATUS FOR BASELINE WANDER COMPENSATION IN ETHERNET APPLICATION

(75) Inventor: Yuan-Shuo Chang, Taoyuan (TW)

(73) Assignee: Realtek Semiconductor Corp., Hsinchu (TW)

( * ) Notice: Subject to any disclaimer, the term of this patent is extended or adjusted under 35 U.S.C. 154(b) by 974 days.

(21) Appl. No.: 11/905,882

(22) Filed: Oct. 5, 2007

(65) Prior Publication Data

US 2008/0212715 A1 Sep. 4, 2008

(51) Int. Cl.
  *H04L 25/06* (2006.01)
(52) U.S. Cl. .................. 375/350; 375/346; 375/317
(58) Field of Classification Search .............. 375/350, 375/346, 316, 317, 232, 233; 370/290, 291, 370/292
  See application file for complete search history.

(56) References Cited

U.S. PATENT DOCUMENTS

| | | | |
|---|---|---|---|
| 6,140,857 A | 10/2000 | Bazes | |
| 6,169,764 B1* | 1/2001 | Babanezhad | 375/233 |
| 6,415,003 B1 | 7/2002 | Raghavan | |
| 6,433,608 B1 | 8/2002 | Huang | |
| 6,614,842 B1* | 9/2003 | Chou et al. | 375/232 |
| 6,618,436 B2 | 9/2003 | Greiss et al. | |
| 7,254,194 B2 | 8/2007 | Lin et al. | |
| 7,706,297 B1* | 4/2010 | Venkatraman | 370/252 |
| 2003/0026334 A1* | 2/2003 | Chang et al. | 375/232 |
| 2003/0206604 A1 | 11/2003 | Lai | |
| 2006/0120491 A1* | 6/2006 | Yen et al. | 375/345 |
| 2007/0104301 A1* | 5/2007 | Esumi et al. | 375/346 |
| 2007/0286315 A1* | 12/2007 | Hong et al. | 375/345 |
| 2008/0298475 A1* | 12/2008 | Huang | 375/257 |

FOREIGN PATENT DOCUMENTS

KR 20060031077 4/2006

OTHER PUBLICATIONS

N.Sommer, I.Lusky and M.Miller, "Analysis of the probability distribution of the baseline wander effect for baseband PAM transmission with application to Gigabit Ethernet", Texas Instruments Broadband Communications Israel, 2004 IEEE.*
Baek,J.H., Hong,J.H., Sunwoo,M.H. and Kim,K.U., "Efficient digital baseline wander algorithm and its architecture for fast Ethernet", Ajou University, South Korea and Samsung, Oct. 2004, IEEE.*
Jae H. Baek, Ju H. Hong, Myung H. Sunwoo, Kyung U. Kim; Efficient Digital Baseline Wander Algorithm and Its Architecture for Fast Ethernet; IEEE; 2004; pp. 136-141.

* cited by examiner

*Primary Examiner* — Chieh M Fan
*Assistant Examiner* — Aristocratis Fotakis
(74) *Attorney, Agent, or Firm* — Thomas, Kayden, Horstemeyer & Risley, LLP

(57) ABSTRACT

An embodiment of the proposed invention is primarily applied to compensate the BLW in communication systems using THPs in their transmitters, especially suitable for the 10GBase-T Ethernet application. The present apparatus includes an additional decision device (slicer) used to generate DC offset information (error signal) and an extra modulus unit after our BLW compensator to reconvert compensated symbols to correct 16-PAM signals. In addition, the estimated error signals in our method are generated from the difference between the input of the BLW compensator and the output of the decision device. These error signals are then weighted to alleviate the impact of erroneous DC offset information on the performance of the BLW compensator. Therefore, a more direct and accurate DC offset information can be derived to improve the inaccurate BLW estimation in previous works.

15 Claims, 7 Drawing Sheets

METHOD AND APPARATUS FOR BASELINE WANDER COMPENSATION IN ETHERNET APPLICATION

BACKGROUND OF THE INVENTION

1. Field of the Invention

This present invention relates to data communication systems and, more specifically, to the compensation of baseline wander phenomenon in baseband transceiver systems.

2. Description of the Prior Art

During the last two decades, the dramatically increasing computing power in PCs and the widespread popularity of Internet applications result in a continuously rising demand for vast and rapid data processing, storage and communication. To serve the demand on raising transmission data rate between users, Ethernet technology evolves, since the 1990s, from 10 Mbps Ethernet to the emerging 10 Gigabit (10G) Ethernet. Based on different application environments and commercial targets, the IEEE 802.3 task force has established a variety of standards to expedite the Ethernet development in many areas. Now the application of 100Base-TX Fast Ethernet in local area networks (LANs) has become one of the most prevalent approaches to achieve high-speed data exchange between neighbor computers and electronic appliances. As 1000Base-T Ethernet will be substituted for 100Base-TX Ethernet as the standard equipment in next-generation computer systems, the aggregate bandwidth of current backbone networks could be the bottleneck in constructing the future information superhighway. Therefore, to meet the requirement of supporting more bandwidth in data transmission, the IEEE 802.3an working group set about defining a new 10 Gb/s transceiver that would support links of up to 100 meters on category 6 or 7 copper wires [see IEEE Draft P802.3an/D3.0]. The 10GBase-T Ethernet standard is going to be approved in the mid of 2006 and its application will be realized in data centers in its initial phase to provide sufficient bandwidth in backbone networks for the coming 1000Base-T Ethernet era.

A brief block diagram of 10 GBase-T Ethernet transceivers is shown in FIG. 1. The 10G system supports operation over 4-connector structured 4-pair, twisted copper cabling at the transmission rate of 800 megasymbol/s on each pair where each symbol represents 3.125 bits. It only supports full duplex operation on each pair. Accordingly, a hybrid 10 is used to couple the transceiver to and from the copper wire 11 for each pair. The 10G transceiver comprises two parts: one is the transmitter that encodes and modulates the data from a host and then sends the modulated signals to a remote end; the other is the receiver that demodulates and decodes received signals and passes these restored data to the host. In the transmit path, Media Access Control (MAC) unit 12, in charge of processing requests from the host and managing the link, delivers data blocks to the physical layer of the transceiver through the XGMII interface 13. Then the physical coding sublayer (PCS) 14 of the physical layer scrambles the data bits from the MAC unit 12, encodes the scrambled bits by a low-density parity-check (LDPC) encoder and finally maps every 7 bits of the encoded output bit stream into 2 16-level pulse amplitude modulation (16-PAM) symbols. The 16-PAM technique is used to transform data bits into a set of predefined amplitudes to increase transmission efficiency in a bandlimited channel. The 16-PAM symbols are further processed by a Tomlinson-Harashima Precoder (THP) 16, which pre-equalizes signals prior to transmission to compensate the signal loss and distortion in a frequency-selective channel. Furthermore, the digitized symbols after pre-equalization are converted into continuous-time analog waveform by a digital-to-analog converter (DAC) 18 and then filtered by an analog filter 20 to roll off the high frequency spectral response to limit high frequency emissions. Eventually, the line driver 22 pushes analog waveform across the hybrid 10 and copper wire 11 to its opposite receiver.

In the receive path, the hybrid 10 couples signals on the copper wire 11 to the 10G receiver, and then the front-end analog filter 24 removes the high-frequency signal components lying out of the interest band to prevent the sampled data at the posterior analog-to-digital converter (ADC) 28 from aliasing. Before the ADC samples signals, a programmable gain amplifier (PGA) 26 is employed to adjust the range of input amplitude not beyond the acceptable maximum input amplitude of the ADC 28. Therefore, the following ADC 28 can sample and quantize incoming analog waveform and output digitized samples to the feedforward equalizer 29 without unwanted clipping noise. Subsequently, the feedforward equalizer 29 processes the digitized output samples by whitening the noise that added in the received signals during transmission and canceling residue intersymbol interference (ISI) to enhance the signal-to-noise ratio (SNR) at the equalizer output. After equalization, the equalized symbols are further passed to the receive unit in PCS (not clearly shown in FIG. 1) in which these symbols are transformed into a sequence of data bits, decoded by a LDPC decoder and descrambled to recover its original data blocks. Finally the information bits are sent to the host if the MAC layer validates these data blocks from the PCS.

As shown in FIG. 1, the copper wire 11 and the Ethernet transceiver are joined together by the hybrid 10 to support full duplex operation. Therefore, when signals are sent from the transmitter to an opposite receiver, they will pass through a cable and two hybrids 10 at least before detected by the receiver. These hybrids 10 used in the 10G Ethernet application are usually transformers whose frequency response is high pass in nature; thus transmit energy below the cutoff frequency of transformers will be lost. As the result of the indigenous high-pass characteristic, an undesired effect of channel on the transmitted waveform that is commonly termed "baseline wander" (BLW) comes about as the line code used in the baseband transmission systems is DC unbalanced. Once the BLW phenomenon occurs, the baseline of transmitted signals will be shifted up or down based on the polarity of the previous and present transmitted symbols. If symbols with consecutive positive or negative polarity are transmitted over a short time interval, the transformer will block such significant low-frequency energy borne in the transmitted signals that the resultant signal waveform may suffer clipping at the receiver and induce bit errors, even for short line lengths. For the reason, the receiver must compensate for the BLW phenomenon.

The previous techniques for canceling BLW phenomenon in baseband communication systems are listed below:

[1] Mel Buzes, "Method an apparatus for reducing baseline wander", U.S. Pat. No. 6,140,857, Mar. 29, 1999.

[2] Leon Chia-Liang Lin and Gerchih Chou, "Automatic gain control for communication receivers," United States, Patent US 2003/0142659 A1, Jan. 25, 2002.

[3] I. Greiss and E. Lida, "Digital base-band Receiver," United States, U.S. Pat. No. 6,618,436 B2, Sep. 9, 2003.

[4] Sren A. Raghavan, "Digital baseline wander correction circuit," U.S. Pat. No. 6,415,003 B1, Sep. 11, 1998.

[5] Jyh-Ting Lai, "Receiver for baseline wandering compensation," United States, Patent US 2003/0206604 A1. Jul. 12, 2002.

[6] J. H. Baek, J. H. Hong, M. H. Sunwoo and K. Y. Kim, "EFFICIENT DIGITAL BASELINE WANDER ALGORITHM AND ITS ARCHITECTURE FOR FAST ETHERNET," in Proc. IIEEE Signal Processing Systems, 2004

[7] US Patent/Publication No. 6433608; 6140857; 6415003; 6618436; 20030142659; 20030206604.

These techniques can be classified into three groups. The first one [1] is that the BLW is estimated and compensated in an analog domain as shown in FIG. 2. It comprises a BLW compensator 30, an ADC 32, a feedforward filter (FFF) 34, an adder 35, a slicer 36 and a feedback filter (FBF) 38. Although canceling the BLW in the analog domain looses the design requirement for ADC 32, the power consumption and the required area in chips are relatively large when compared to those in the digital compensation methods [3]-[6]. To improve the first method, C. L. Ling and G. C. Chou in [2] proposed another method that estimates the BLW in the digital domain and cancels it in the analog domain. It comprises a BLW compensator 30, an ADC 32, a FFF 34, adders 35, 37, a slicer 36 and a FBF 38. While this method may offer a good scheme to reduce the BLW, the closed-loop latency between the estimation and the removal of BLW, which is shown is FIG. 3, is too long to easily maintain the stability of the loop. In addition, additional hardware, such as a digital-to-analog converter and a low-pass filter are required for removing the BLW in the analog domain.

The third group implements the BLW estimation and cancellation functions only in the digital domain. The BLW compensator [3] shown in FIG. 4 includes a BLW compensator 30, an ADC 32, a FFF 34, an adder 35, a slicer 36 and a FBF 38. The BLW compensator 30 includes a delay unit 301 and an adder 303. As shown in FIG. 4, the BLW compensator [3] includes a simple pre-coding section that subtracts each received sample from a preceding sample to generate corrected data. This pre-coder compensates the BLW with relatively simple hardware and minimizes the interaction between the FFF 34 and the BLW compensator 30. However, because only two symbols, the present and the previous symbol, are utilized to estimate the BLW, errors may happen in removing the DC offset when the incoming symbols have insignificant DC components. This may lead to a catastrophic effect that removing the normal signals by using incorrect estimation. The other digital approaches are presented in [4]-[6], whose architectures are briefly illustrated in FIG. 5. It includes a BLW compensator 30, an ADC 32, a FFF 34, adders 35, 37, a slicer 36, a FBF 38 and a BLW estimator 39. These digital compensators all estimate the DC offset by using error signals generated from the difference between the output of the decision device (slicer 36) and either the input (the dotted line) or output (the solid line) of the FFF 34, and then compensate the BLW before (the dotted block) or after (the solid block) the FFF 34. These existing digital compensators are efficiently implemented in current digital circuit techniques.

SUMMARY OF THE INVENTION

It is an objective of the claimed invention to provide a method and apparatus thereof for baseline wander compensation.

An embodiment of the proposed invention is primarily applied to compensate the BLW in communication systems using THPs in their transmitters, especially suitable for the 10GBase-T Ethernet application. The present apparatus includes an additional decision device (slicer) used to generate DC offset information (error signal) and an extra modulus unit after our BLW compensator to reconvert compensated symbols to correct 16-PAM signals. In addition, unlike the previous method [4]-[6], the estimated error signals in our method are generated from the difference between the input of the BLW compensator and the output of the decision device. These error signals are then weighted to alleviate the impact of erroneous DC offset information on the performance of the BLW compensator. Therefore, a more direct and accurate DC offset information can be derived to improve the inaccurate BLW estimation in previous works.

These and other objectives of the present invention will no doubt become obvious to those of ordinary skill in the art after reading the following detailed description of the preferred embodiment that is illustrated in the various figures and drawings.

DETAILED DESCRIPTION

All the aforementioned prior arts are not practicable to compensate BLW in a baseband transceiver using a Tomlinson-Harashima Precoder (THP) in its transmitter. The purpose of THP comprising an adder, a feedback filter and a modulus unit is to pre-equalize the overall channel response, which is from the transmit filter to the equalizer in its opposite receiver. To keep the value of the THP output samples from exceeding the acceptable DAC input range, the modulus unit is employed to fold the THP output samples into the range from −16 to 16. Hence, due to the additional modulus operation in the transmitter, a corresponding modulus unit is placed after the receiver equalizer to restore its original 16-PAM symbols. However, this modulus operation unfortunately may result in a wrong BLW compensation as the previous digital BLW compensation methods are applied in this application. Let's explain this unwanted effect by the following example. Under the assumption of no other noises introduced in the receiver, if a received symbol is at the absence of BLW, the modulus unit can correctly recover it to its initial pre-defined value. However, if an equalized symbol especially whose original value is around the multiple of 15 or −15 is corrupted by additional BLW, the corrupted symbol may be transformed into a value around −15 or 15 with a reverse sign after the modulus operation. The incorrect value is further processed by a following slicer to derive its final decision value and to feedback an error signal to the aforesaid digital BLW estimators. The error signal provides completely opposite DC offset information, thus deteriorating the BLW phenomenon and inducing a burst of bit errors. To solve the problem, we proposed a novel BLW compensator well suited to remove the BLW in a baseband transceiver using a THP in its transmitter.

Figure 1:
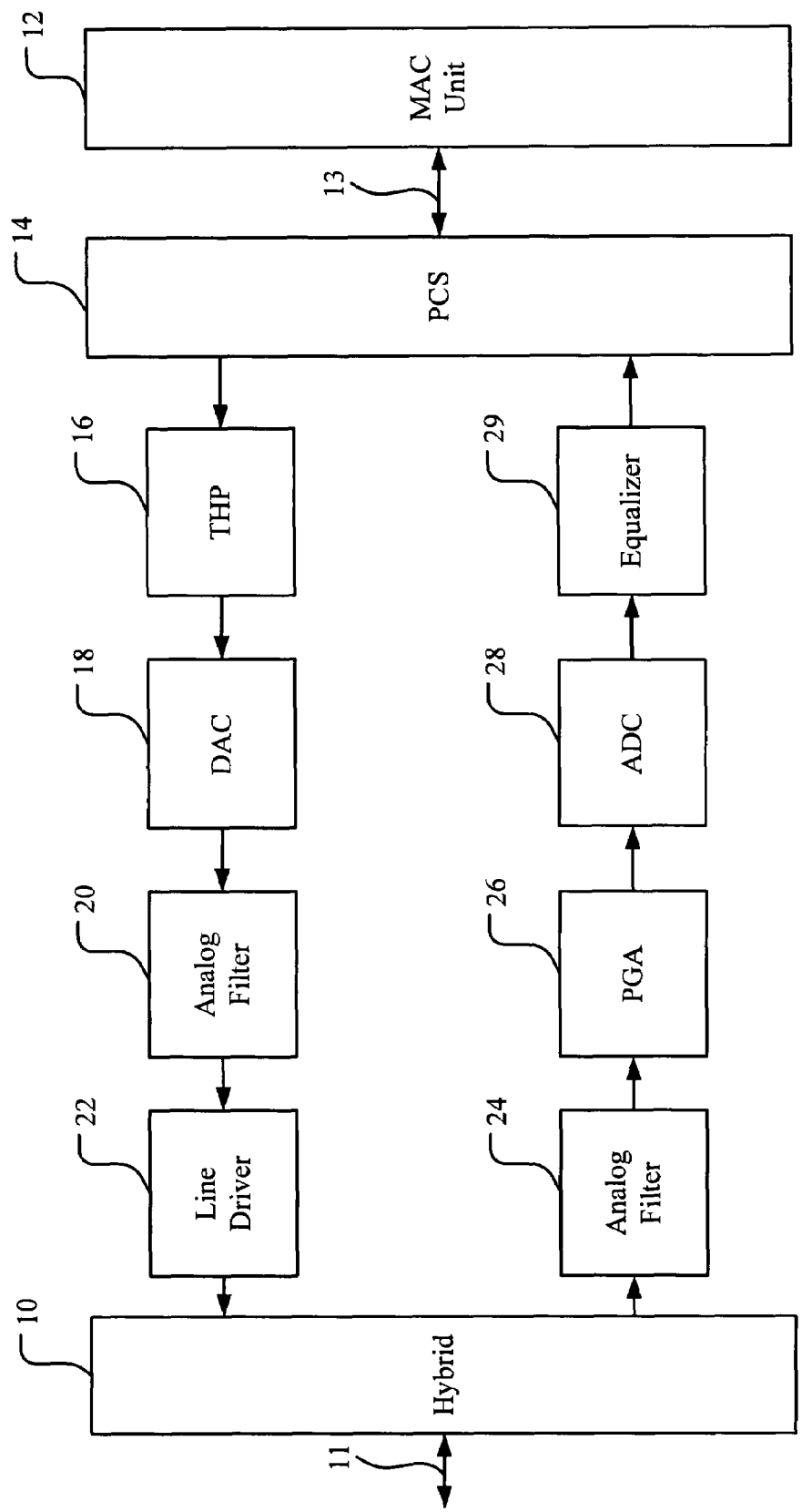
FIG. 1 is a brief block diagram of 10GBase-T Ethernet transceivers.
Figure 2:
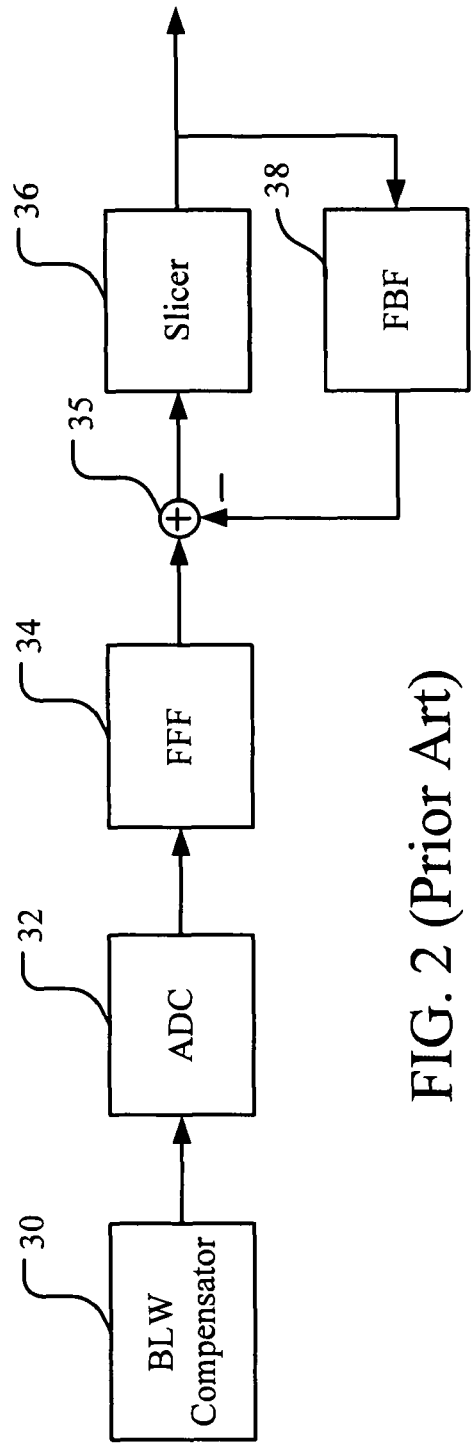
FIG. 2 is a block diagram of prior art.
Figure 3:
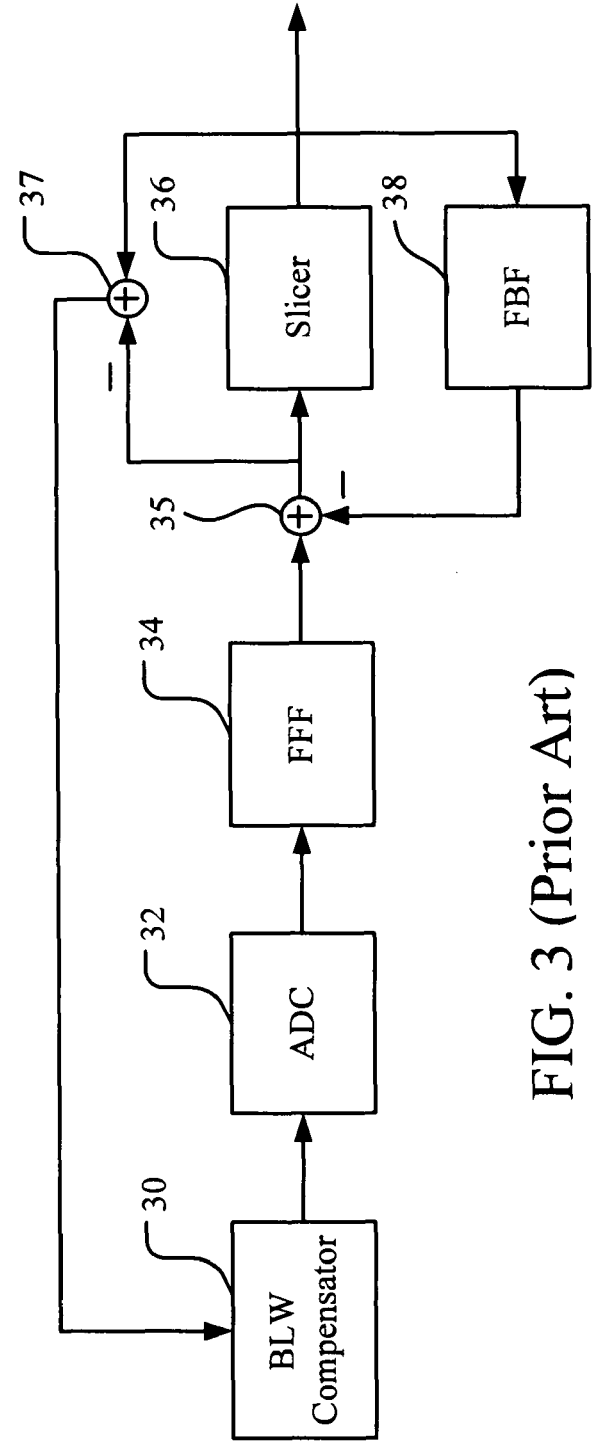
FIG. 3 is a block diagram of prior art.
Figures 4, 5:
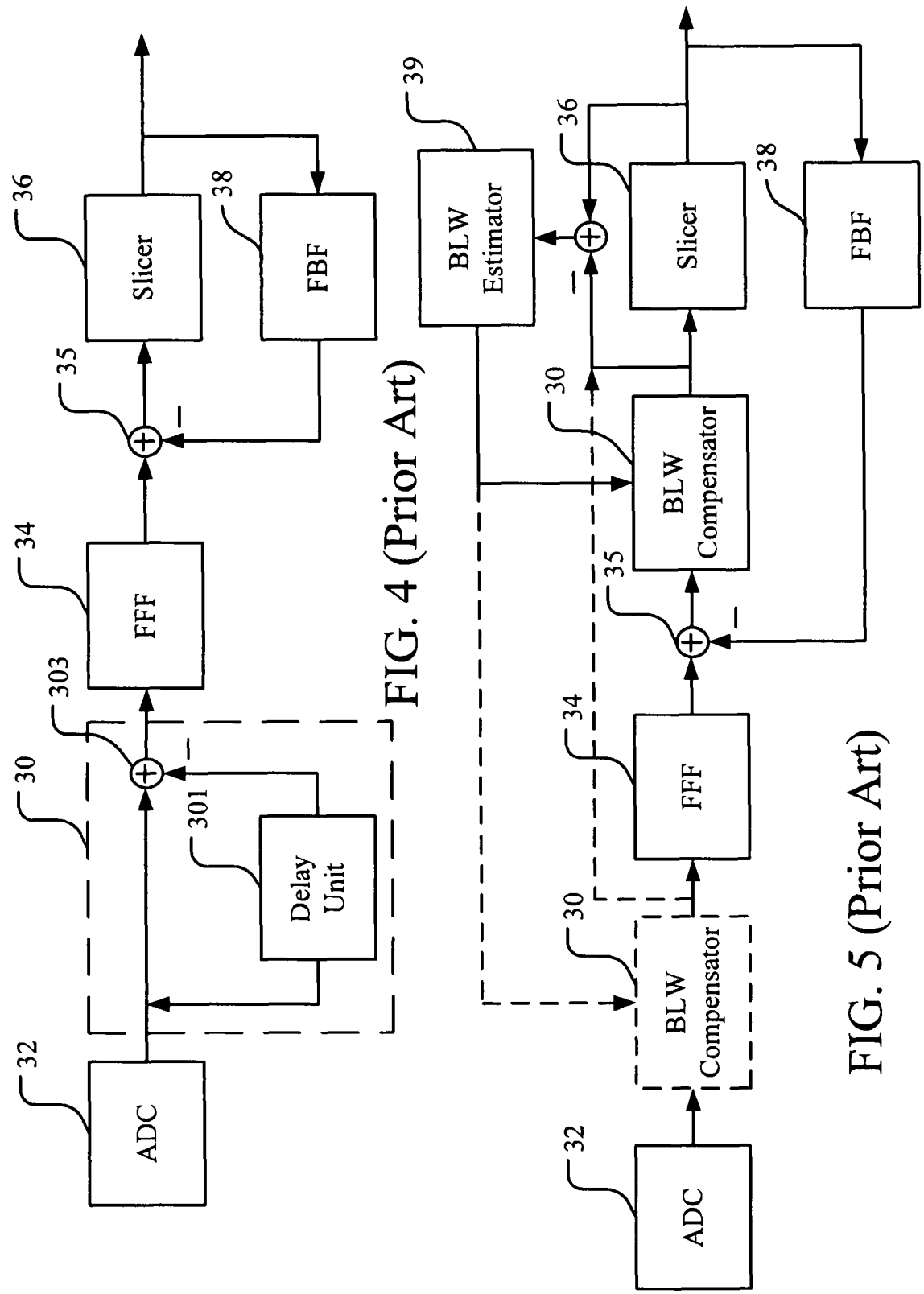
FIG. 4 is a block diagram of prior art.
FIG. 5 is a block diagram of prior art.
Figure 6:
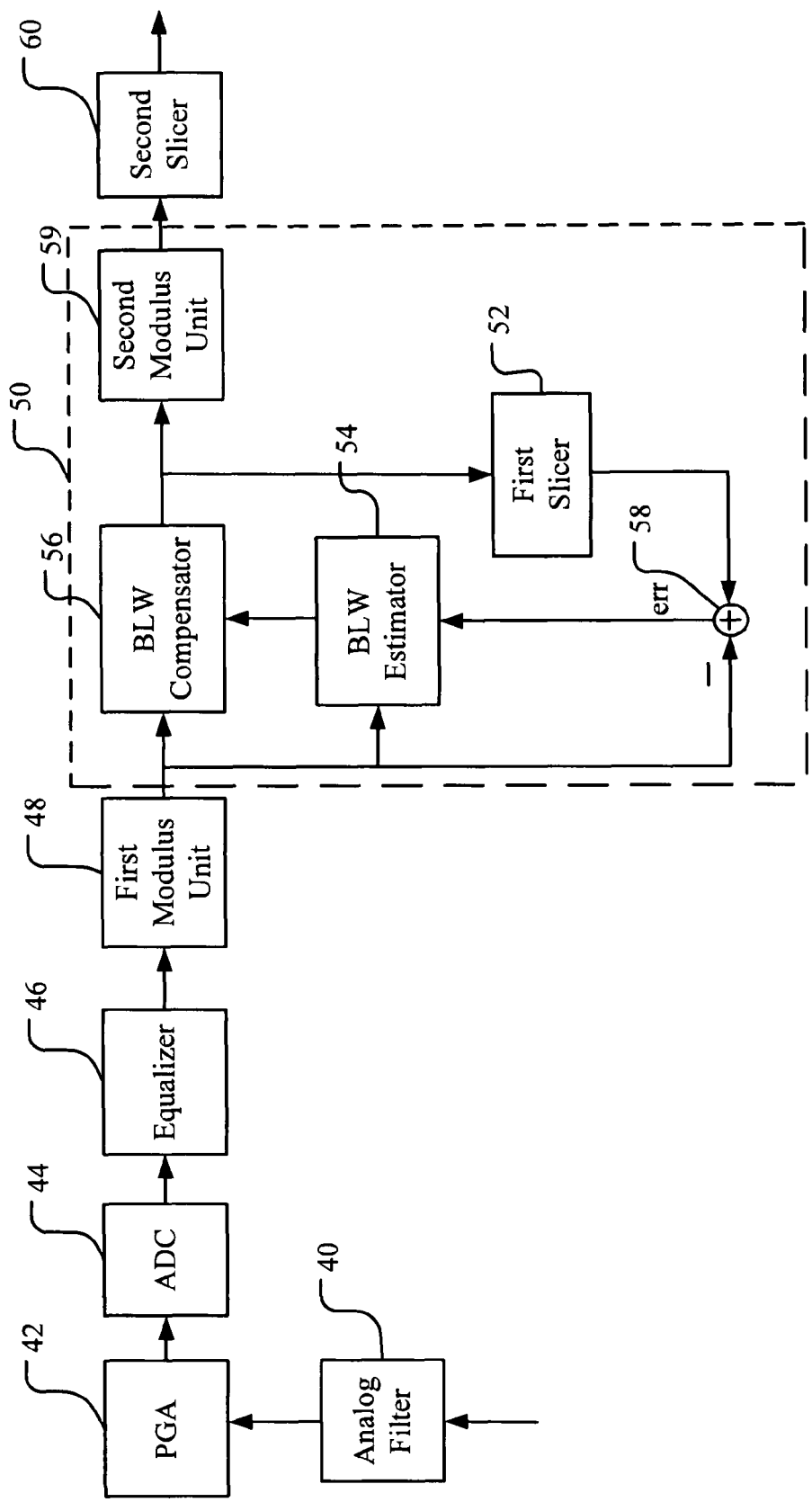
FIG. 6 is a block diagram of the proposed BLW compensation scheme.

FIG. 6 shows a block diagram of an embodiment of a 10GBase-T Ethernet baseband receiver system for each pair according to the present invention. The receiver system includes, coupled in series, an anti-aliasing analog filter 40, a programmable gain amplifier (PGA) 42, an analog-to-digital converter (ADC) 44, an equalizer 46, a first modulus unit 48, a proposed baseline wander (BLW) compensation circuit 50 to compensate BLW, and a decision device (slicer) 60. In this proposed BLW compensation circuit 50, an first slicer 52, a BLW estimator 54, a BLW compensator 56, an adder 58 and a second modulus unit 59 are involved to complete the BLW compensation scheme. Other essential function blocks e.g. echo canceller, cross-talk canceller, gain control unit, timing recovery unit and adaptation unit, are not shown in the FIG. 6 for the purpose of clearly illuminating our proposed invention.

Firstly, the analog filter 40 suppresses the high-frequency signal components of received signals to prevent sampled data at the subsequent ADC 44 from aliasing and then the programmable gain amplifier 42 adjusts the input amplitude of the filtered analog signals to generate the analog signals having a proper voltage such that the following ADC 44 can operates in an acceptable dynamic range. The ADC 44 generates the digital signals according to the analog signals. After the ADC 44 samples and quantizes the received symbols of the analog signals, these digitized samples of the digital signals are then processed by the equalizer 46 to compensate impaired signals through an imperfect channel.

Due to the modulus operation in the transmitter, a corresponding modulus unit 48 is necessary to be realized after the equalizer 46 to fold the expanded equalized samples of the equalizing signals into the range between 16 and −16, where the number 16 comes from the 16-PAM technique adopted in the 10G Ethernet system. Finally, a following slicer 60 in a conventional receiver will restore these symbols into their original 16-PAM symbols which are 16 discrete values uniformly lying in the range from 15 to −15. However, if the BLW corrupts the equalized symbols, the shifted symbols may result in incorrect results after the modulus operation. Let's take the following example to illustrate it. Assume that an original transmitted symbol is 15 and a DC offset present at that symbol time due to the BLW is 1.2, then the corrupted symbol is 16.2. After the modulus operation, the corrupted symbol will be converted to the value of −15.8. The unwanted result will cause a wrong decision on the symbol after the slicer 60 and generate opposite DC offset information, −0.8, which shall be +1.2 if correct. The incorrect DC offset information then feedbacks to the BLW compensators, thus worsening the system performance far more.

To improve the performance of existing BLW compensators applied in the 10GBase-T Ethernet application, we proposed a new architecture to compensate the BLW phenomenon in baseband communication systems with THPs in their transmitter. The architecture includes BLW compensator 56, BLW estimator 54, additional first slicer 52, adder 58 and an extra second modulus unit 59. It can remove the BLW successfully by the following process. Firstly, the BLW-corrupted symbols of the input signals after the first modulus unit 48 are compensated by the BLW compensator 56. The BLW compensator 56 receives the input signals for generating the output signals according to a compensations signal generated from the BLW estimator 54. The BLW compensator 56 is an adder that subtracts the estimated BLW from the corrupted symbol according to the compensations signal. Then the extra first slicer 52 generates first slicing signals according to the output signals. The first slicer 52 predetermines possible PAM constellation of the compensated symbols of the output signals by mapping them into a pre-defined set of 16-PAM values.

An error signal err used to estimate the BLW is generated next by subtracting the input symbol of the input signal of the BLW compensator 56 from the predetermined 16-PAM value of that symbol of the first slicing signal. The following BLW estimator 54 further utilizes the error signal to calculate the shifted level of the baseline and generates the compensation signal to offer the BLW compensator 56 the estimate, which will be used cancel the BLW at the next symbol time. Eventually, if the removal of the BLW from the received symbol is correct, the second modulus unit 59 generates the adjusted signal according to the output signal that reconverts the compensated symbol of the output signal to proper signal level: for instance, the compensated symbol lying outside the range of 16 to −16 is required to circularly fold inside the range to avoid wrong decision by the following second slicer 60. The second slicer 60 generates the second slicing signal according to the adjusted signal.

Figure 7:
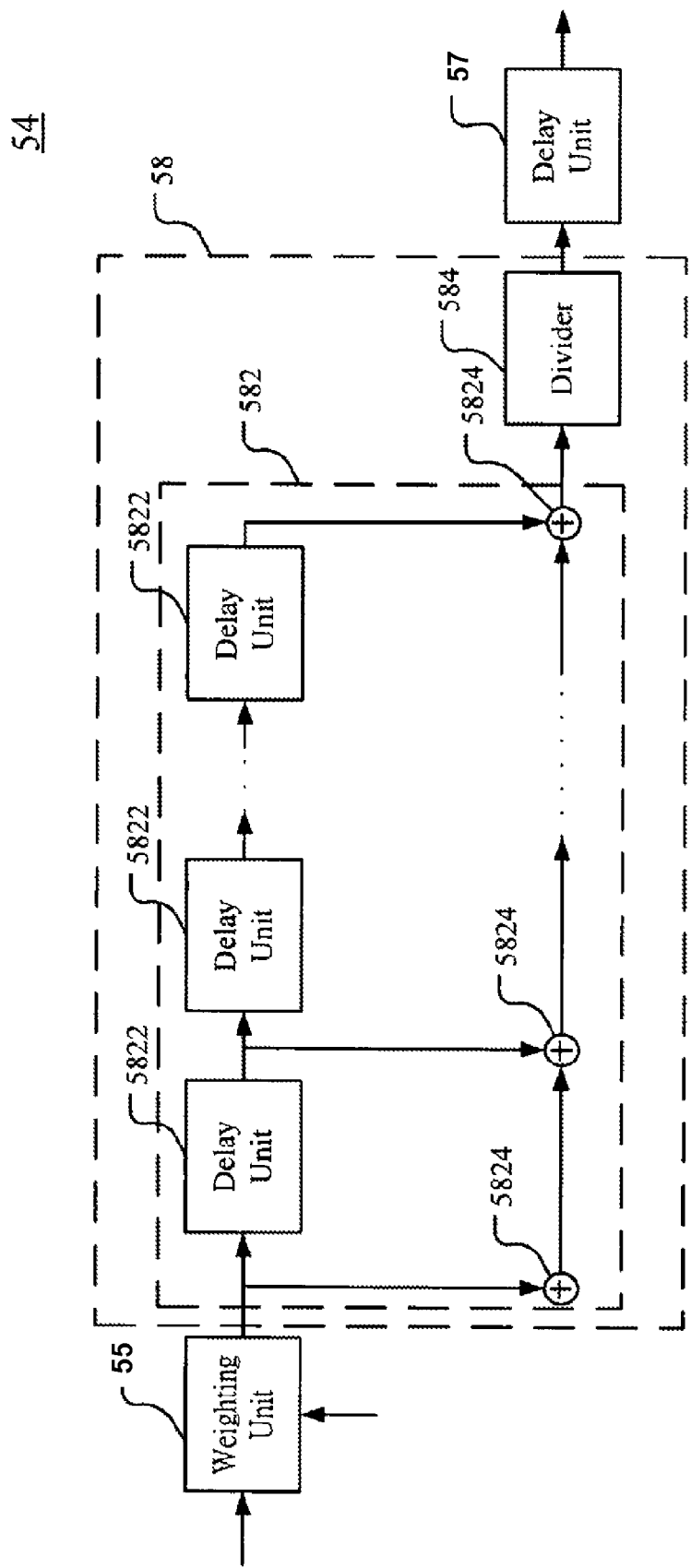
FIG. 7 is a block diagram of the BLW Estimator.

FIG. 7 shows the block diagram of the BLW estimator 54 that consists of a weighting unit 55, a filtering circuit 58 having a filter 582 and a divider 584, and a delay unit 57. The filter 582 includes delay units 5822 and adding units 5824. The weighting unit 55 is coupled to the BLW compensator 56 and the adder 58 (shown in FIG. 6) for generating a weighting signal according to the input signal and the error signal err. The filtering circuit 58 utilizes the filter 582 to accumulate the weighting signal generated at different time and thereby outputting a filtering signal for generating the compensation signal. At first, the above error signals err are passed through the weighting unit 55 to produce a weighted result by the following rule.

if the absolute value of the uncompensated symbol of the input signal is larger than a threshold
    produce c*err as output where c is a weighting factor between 0 and 1.
Else
    produce err as output
where in the output is the weighting signal. The threshold can be 15.

The objective of the weighting factor c is to mitigate the influence of possibly incorrect error signals err, which comes from the modulus operation on excessively shifted symbols by the BLW around the multiples of 16 or −16. Without the weighting factor, the incorrect error signals err, usually providing opposite DC offset information, lead to a more serious BLW on corrupted symbols, thus largely aggravating the degradation of overall system performance. Then the output of the weighting unit is fed into the moving average filter 582 including N−1 delay units 5822 and N adding units 5824 to estimate the shifted baseline. The delay units 5822 are coupled together in series for outputting the weighting signal generated at different time. The adding units 5824 are coupled together in series for summing the weighting signal generated at different time and thereby outputting the filtering signal. After the error signals err are passed through the moving average filter 582, which is low pass in nature, only low-frequency signal components containing significant DC content are left and then the filtering signal divided by N by the divider 584 to generate the compensation signal to derive the final estimated BLW. The BLW compensator 56 finally removes the BLW by subtracting the estimated BLW delayed one clock cycle by the delay unit 57 from the coming symbol to reconstruct a BLW-free symbol.

Figure 8:
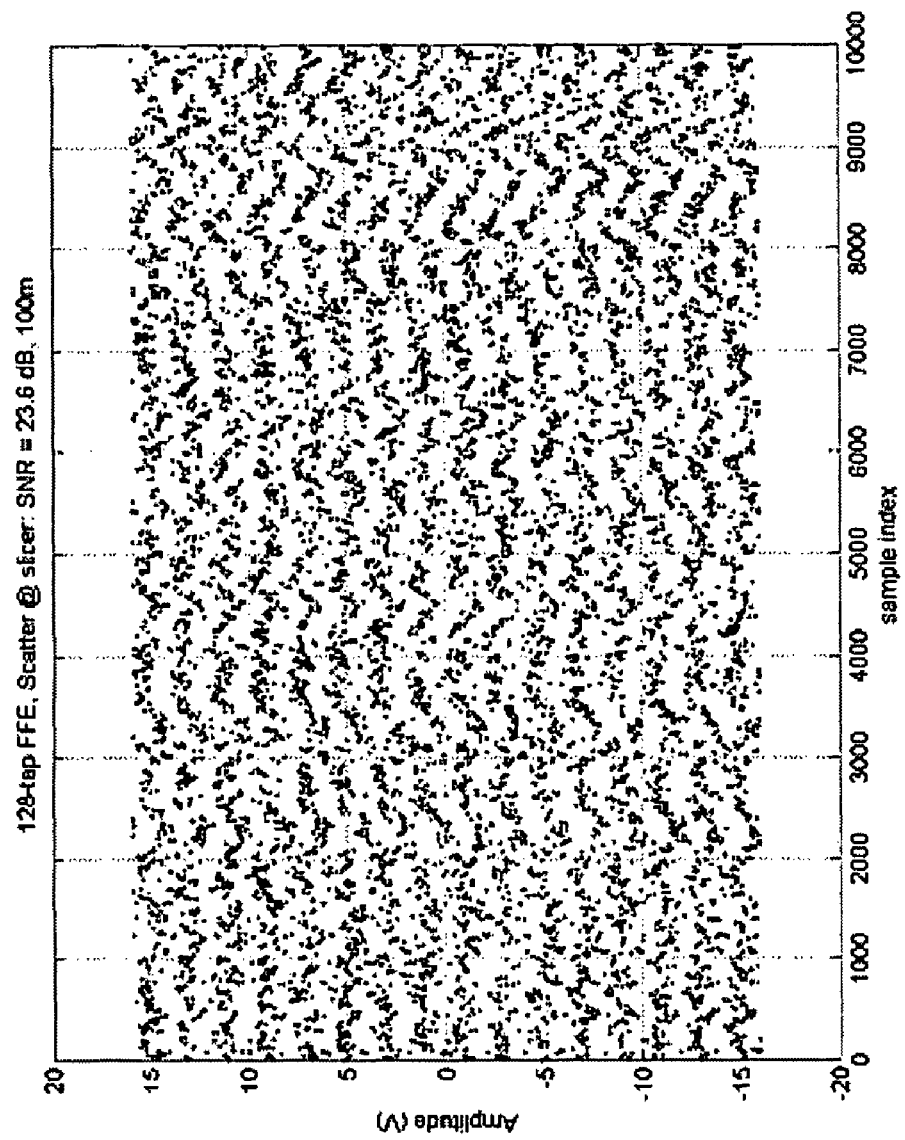
FIG. 8 is the simulation result showing the BLW phenomenon before a BLW compensator.
Figure 9:
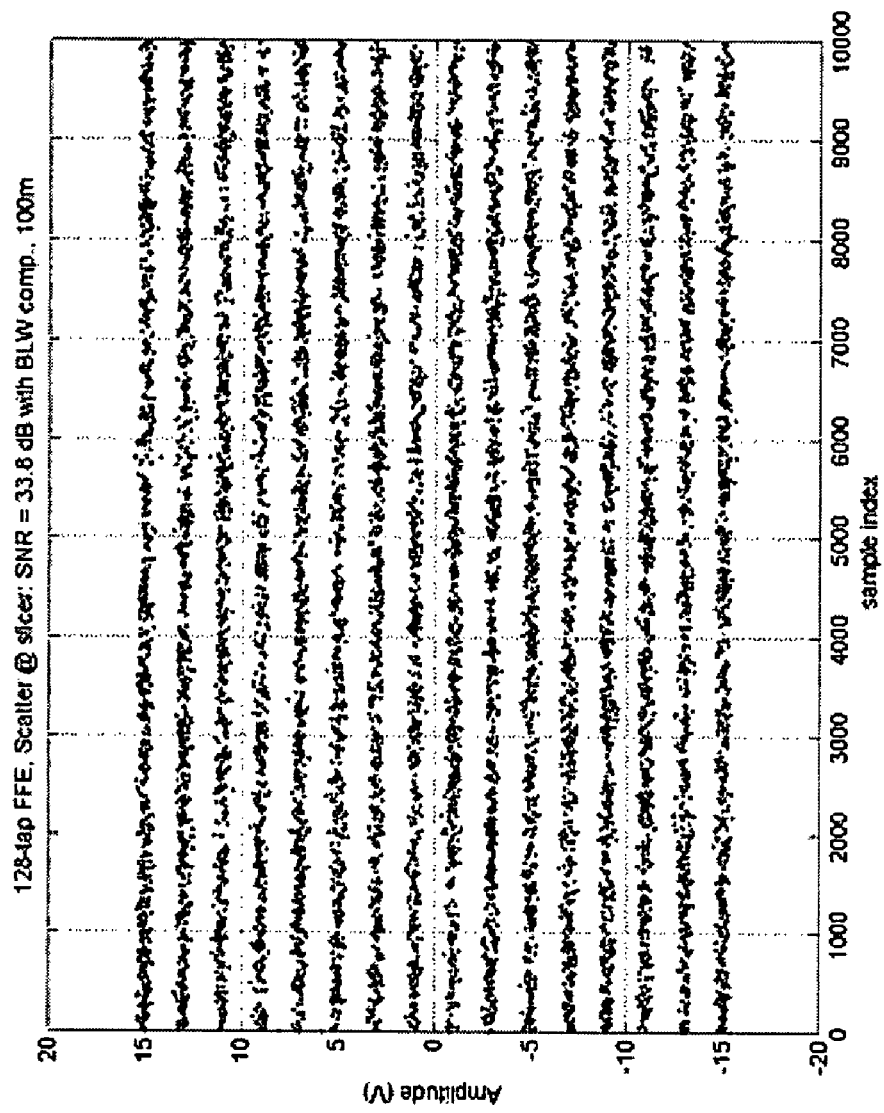
FIG. 9 is the simulation result at the output of the proposed BLW compensator.

To validate the effectiveness of the proposed method in canceling BLW, a simulation based on the 10 GBase-T Ethernet application (see IEEE P802.3an Draft 3.0) is run and its simulation result is shown below. The transmission cable is of the type of shielded category 6 with the length up to 100 meters. The transmission power is 5 dBm and the injected noise is of the added white Gaussian noise (AWGN) with −140 dBm/Hz over the bandwidth of 800 MHz. The tap number of the equalizer is 128 and the tap number of the THP is also 128. FIG. 8 shows the simulation result of the output of the first modulus unit. We can find the baseline of the equalized symbols is shifted up or down with time and the signal-to-noise ratio (SNR) calculated at the slicer output is only 23.6 dB, assumed no BLW compensation is realized herein. FIG. 9 shows the compensation result by the proposed method. The BLW phenomenon is removed and the SNR calculated at the slicer output can reach 33.8 dB, thus largely decreasing bit error rate. From the simulation result, the present method enhances the SNR more than 10 dB and diminishes the risk of incorrect compensation resulting from the presence of potential opposite DC offset information. In addition, this method is implemented digitally so we can save consumption power and chip area efficiently. The closed-loop latency is also so small that it's easy to maintain the stability of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baseline wander (BLW) compensation apparatus, comprising:
   a BLW compensator for receiving an input signal and thereby generating an output signal based on a compensation signal;
   a slicer, coupled to the BLW compensator, for generating a slicing signal based on the output signal;
   an error signal generator, interposed between the BLW estimator and the slicer, for receiving the input signal and the slicing signal and generating an error signal based on a combination of the slicing signal, an output from a first modulus unit, and the input signal;
   a BLW estimator, coupled between the error signal generator and the BLW compensator, for generating the compensation signal based on the error signal;
   wherein the BLW estimator further comprises: a filter, coupled to a non-unity weighting unit, for accumulating a weighted error signal; generated at different time and thereby outputting a filtering signal; and
   a divider, coupled to the filter, for generating the compensation signal according to the filtering signal.

2. The BLW compensation apparatus of claim 1, wherein the filter further comprises:
   a plurality of delay units, coupled together in series, for outputting the weighted error signal generated at different time; and
   a plurality of adding units, coupled together in series, for summing the weighted error signal generated at different time and thereby outputting the filtering signal.

3. The BLW compensation apparatus of claim 1 further comprising:
   the first modulus unit being coupled to an input terminal of the BLW compensator, for generating the input signal according to a digital signal; and
   a second modulus unit, coupled to an output terminal of the BLW compensator, for generating an adjusted signal according to the output signal.

4. The baseline wander (BLW) compensation apparatus of claim 1, wherein the BLW estimator comprises:
   a weighting unit, coupled to the BLW compensator and the error signal generator, for generating the weighted error signal according to the input signal and the error signal.

5. An ethernet receiver, comprising:
   an analog-to-digital converter for generating a digital signal according to an analog signal;
   an equalizer, coupled to the analog-to-digital converter, for generating an equalizing signal according to the digital signal;
   a first modulus unit, coupled to the equalizer, for generating an input signal according to the digital signal; and
   a baseline wander (BLW) compensation circuit, coupled to the first modulus unit, comprising:
   a BLW compensator for receiving the input signal and thereby generating an output signal according to a compensation signal;
   a first slicer, coupled to the BLW compensator, for generating a first slicing signal according to the output signal;
   an adder, coupled between the BLW compensator and the first slicer, for receiving the input signal and the first slicing signal and thereby generating an error signal;
   a BLW estimator, coupled between the adder and the BLW compensator, for generating the compensation signal according to the error signal; and
   a second modulus unit, coupled to the BLW compensator, for generating an adjusted signal according to the output signal.

6. The ethernet receiver of claim 5 further comprising:
   a second slicer, coupled to the second modulus unit, for generating a second slicing signal according to the adjusted signal.

7. The ethernet receiver of claim 5 further comprising:
   an analog filter for filtering a received signal and thereby generating a filtered analog signal; and
   an amplifier, coupled to the analog filter, for outputting the analog signal to the analog-to-digital converter according to the filtered analog signal.

8. The ethernet receiver of claim 5, wherein the BLW estimator comprises:
   a weighting unit, coupled to the BLW compensator and the adder, for generating a weighted signal according to the input signal and the error signal; and
   a filtering circuit, coupled to the weighting unit, for generating the compensation signal according to the weighted signal generated at different time.

9. The ethernet receiver of claim 8, wherein the filtering circuit further comprises:
   a filter, coupled to the weighting unit, for accumulating the weighted signal generated at different time and thereby outputting a filtering signal; and
   a divider, coupled to the filter, for generating the compensation signal according to the filtering signal.

10. The ethernet receiver of claim 9, wherein the filter further comprises:
    a plurality of delay units, coupled together in series, for outputting the weighted signal generated at different time; and
    at least one adding unit for summing the weighted signal generated at different time and thereby outputting the filtering signal.

11. A baseline wander (BLW) compensation method, comprising:
    receiving an input signal and generating an output signal based on a combination of the input signal and a compensation signal;
    generating a slicing signal based on the output signal;

generating an error signal based on a combination of the input signal, an output from a modulus unit, and the slicing signal; and generating the compensation signal based on the error signal;

wherein the step of generating the compensation signal comprises:

generating a weighted signal according to the input signal and the error signal; and generating the compensation signal according to the weighted signal generated at different time;

wherein the step of generating the weighted signal comprises:

obtaining a comparing relation between the input signal and a threshold;

generating the weighted signal according to an weighting factor and the error signal when the comparing relation indicates a first condition; and outputting the error signal as the weighted signal when the comparing relation indicates a second condition.

12. The BLW compensation method of claim 11, wherein the step of generating the compensation signal according to the weighted signal generated at different time comprises:

accumulating the weighted signal generated at different time and thereby outputting a filtering signal; and generating the compensation signal according to the filtering signal.

13. The BLW compensation method of claim 12, wherein the step of outputting the filtering signal comprises:

utilizing a plurality of delay units coupled in series and thereby outputting the weighted signal generated at different time; and summing the weighted signal generated at different time and thereby outputting the filtering signal.

14. The BLW compensation method of claim 11, wherein the step of generating the weighted signal comprises:

obtaining a comparing relation between the input signal and a threshold;

generating the weighted signal according to an weighting factor and the error signal when the comparing relation indicates a first condition; and outputting the error signal as the weighted signal when the comparing relation indicates a second condition.

15. The BLW compensation method of claim 14, wherein the first condition represents a value derived from the input signal is larger than the threshold and the second condition represents the value is equal to or smaller than the threshold.

* * * * *